Patented Mar. 19, 1935

1,994,810

UNITED STATES PATENT OFFICE 1,994,810

COMPOSITION OF MATTER

Marc Darrin, Pittsburgh, Pa., assignor to F. N. Burt Company, Limited, Toronto, Ontario, Canada, a corporation of Ontario, Canada No Drawing. Application December 31, 1929, Serial No. 417,827

6 Claims. (Cl. 23—239)

This invention is a new composition of matter.

It is the object of this invention to provide a new composition of matter capable of a widespread variety of uses.

The new composition comprises certain halogen substitution products of diphenyls. When hydrocarbons, particularly those having a benzene ring, are heated out of contact with air, there are formed a mixture of substances among which are a series of compounds in which a plurality of benzene rings are joined by a single bond between carbon alone. Many different compounds may be so formed in which two, three, four or more such rings are so joined in chain formation. In some of these greater complexity may arise as for example one or more of the rings so joined may itself be a member of a naphthalene or anthracene group; also side chain benzenes such as toluene may join to form ditolyls, and two naphthalenes may join to form dinaphthyls,—all of which may be said to belong to the diphenyl group.

The particular two-cyclic compounds comprising only two rings so joined may be designated as diphenyls or as two-cyclic diphenyls; the other members of the series, particularly those having three or more such rings or side chains or connecting chains may be designated as higher diphenyls, since they possess properties analogous to two-cyclic diphenyl.

If the hydrocarbon source be benzene, the product is composed almost solely of diphenyls, and frequently, of this about 80% is of the two-cyclic form.

Each of the diphenyls may be chlorinated directly by chlorine gas, giving off one molecule of hydrochloric acid for each molecule of chlorine absorbed.

I am aware that it has been proposed to include certain inorganic diphenyls such as diphenylchlorarsine, diphenylaminechlorarsine in compounds designed solely small proportions in compounds designed solely to give off poisonous material to poison wood borers, see the patent to McQuade #1,758,958, but such inorganic compounds are not suited to the purposes of this invention and are herewith disclaimed and by the term organic diphenyl it is intended to exclude such compounds.

The chlorinated diphenyls herein for brevity called chlorodiphenyls, individually are remarkably resistant chemically, are non-flammable, excellent solvents and blenders, are excellent introflers and possess good penetrative, waterproofing and resisting qualities when used alone or with sulfur or other impregnating substances.

The term introfier is applied to a substance which, when added to an impregnant, tends to increase the ease and the extent to which the impregnant will penetrate the material to be impregnated as distinguished from the mere thinning of the impregnating material by a solvent.

The chlorodiphenyls form excellent solvents for a wide variety of substances including sulfur, resins, oils, fats, greases, waxes, tars, pitches, asphalts, gilsonite, creosote and related products, being usually miscible in all proportions, and remaining in solution in both the liquid and solid state, with no apparent tendency to separation. This property in itself opens a wide variety of uses to the product. It is also miscible with dye stuffs and hence can be readily colored or used as a means of introducing color into other things which of themselves are difficult to color. For example any desired shade can be imparted to sulphur by adding a properly colored chlorodiphenyl.

The property of being fireproof is also a valuable one, and it may be used to impart this property to other materials. For this purpose the proportions of the different chlorodiphenyls may be varied to accord with the requirements. For example where flexibility is desired the proportion of two-cyclic chlorodiphenyl may be high, while toughness and hardness may make it desirable to increase the proportions of the higher chlorodiphenyls and/or of sulphur.

Two-cyclic chlorodiphenyls are viscous liquids at ordinary temperatures, and are sensitive to temperature, losing viscosity rapidly as the temperature rises. The higher chlorodiphenyls are solids tending to be more resinous, brittle and intractable.

I have found, however, that where higher chlorodiphenyls are used with two-cyclic chlorodiphenyls, that the foregoing limitations no longer obtain.

When the diphenyl is manufactured by heating benzene as previously described, the product containing about 80% diphenyl with the remainder the higher diphenyls, is eminently suited to chlorination and in that form possesses a hardness, solidity and texture which are remarkable and quite desirable and which make the product a very useful one for many purposes.

When this mixture of chlorodiphenyls is used as an impregnating agent either alone or in combination with sulfur, resins, waxes, asphalts or other bath it penetrates readily into any substance having communicating pores, and it solidifies into a homogeneous impenetrable mass which is dense, coherent and resistant and which is fireproof and a non-conductor of electricity.

The use of sulphur, resins, waxes or asphalts and mixed chlorodiphenyls gives a product which is cheaper and having for some purposes, more desirable properties than where the mixed chlorodiphenyls are used alone. The chlorodiphenyls readily mix with sulphur or asphalts and are excellent introfiers so that the impregnating bath penetrates readily into every crevice. The bath of chlorodiphenyls and sulphur solidifies into a tough mass without crystalline contraction to break up the integral structure. If such a bath be employed, the product will not support combustion if the percent of chlorodiphenyls exceeds 40% of the bath and even less quantities greatly retard combustion.

Such a product has certain advantages over chlorodiphenyls alone, for certain purposes, for example in the sulphur bath, because of the sulfur content the product resists solution in compounds in which the chlorodiphenyls are soluble for example transformer coils so impregnated may be immersed in insulating oils without deterioration.

The temperature of impregnation should be kept as low as practicable and the time of impregnation should be kept short if the substance to be impregnated be liable to deteriorate under prolonged heat. This factor can be controlled by the use of pressure where desired.

I have found moreover, for some reason now unknown to me that with certain substances impregnation takes place more readily if the substance be slightly damp when immersed in the bath. It may be that the generation of steam assists in opening the pores to the impregnating bath.

The chlorodiphenyls may be used in a wide variety of ways. For example they may be applied hot over the surface of wood, stone, brick, paper, pulp, fibre-board or asbestos with a brush or spray, and then if desired, the surface may be heated to permit the material to be absorbed into the surface.

The article if small, may be submerged in a molten bath of the compound, with or without pressure.

For any individual substance it may be necessary to determine by experiment how long it must be kept submerged, and this will also be determined by the thoroughness of impregnation desired.

The invention accordingly comprises a composition of matter possessing the characteristics, properties and the relation of constituents which will be exemplified in the composition hereinbefore described and the scope of the application of which will be indicated in the claims.

Since certain modifications in the composition of matter which embodies the invention may be made without departing from the scope of the invention, it is intended that all matter contained in the above description shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. An impregnating bath comprising a mixture of chlorodiphenyls, the two-cyclic chlorodiphenyls comprising eighty percent, the remainder being higher chlorodiphenyls.

2. A composition of matter comprising a mutual solution of higher chlorodiphenyls in two-cyclic chlorodiphenyls.

3. A composition of matter comprising sulphur in solution in a quantity of chlorodiphenyls, sufficient to render it fireproof.

4. The method of fire-proofing sulphur which comprises, treating the sulphur with halogenated diphenyl.

5. Fire-proofed sulphur which comprises, sulphur and chlorinated diphenyl.

6. The method of fire-proofing sulphur which comprises mixing sulphur with chlorinated diphenyl.

MARC DARRIN.